2,987,387
METHOD FOR THE PRODUCTION OF CARBON MONOXIDE FROM SOLID FUELS
Charles R. Carkeek, Pasadena, and Frank E. Guptill, Jr., Whittier, Calif., assignors to Texaco Inc., a corporation of Delaware
Filed Dec. 30, 1958, Ser. No. 783,775
6 Claims. (Cl. 48—197)

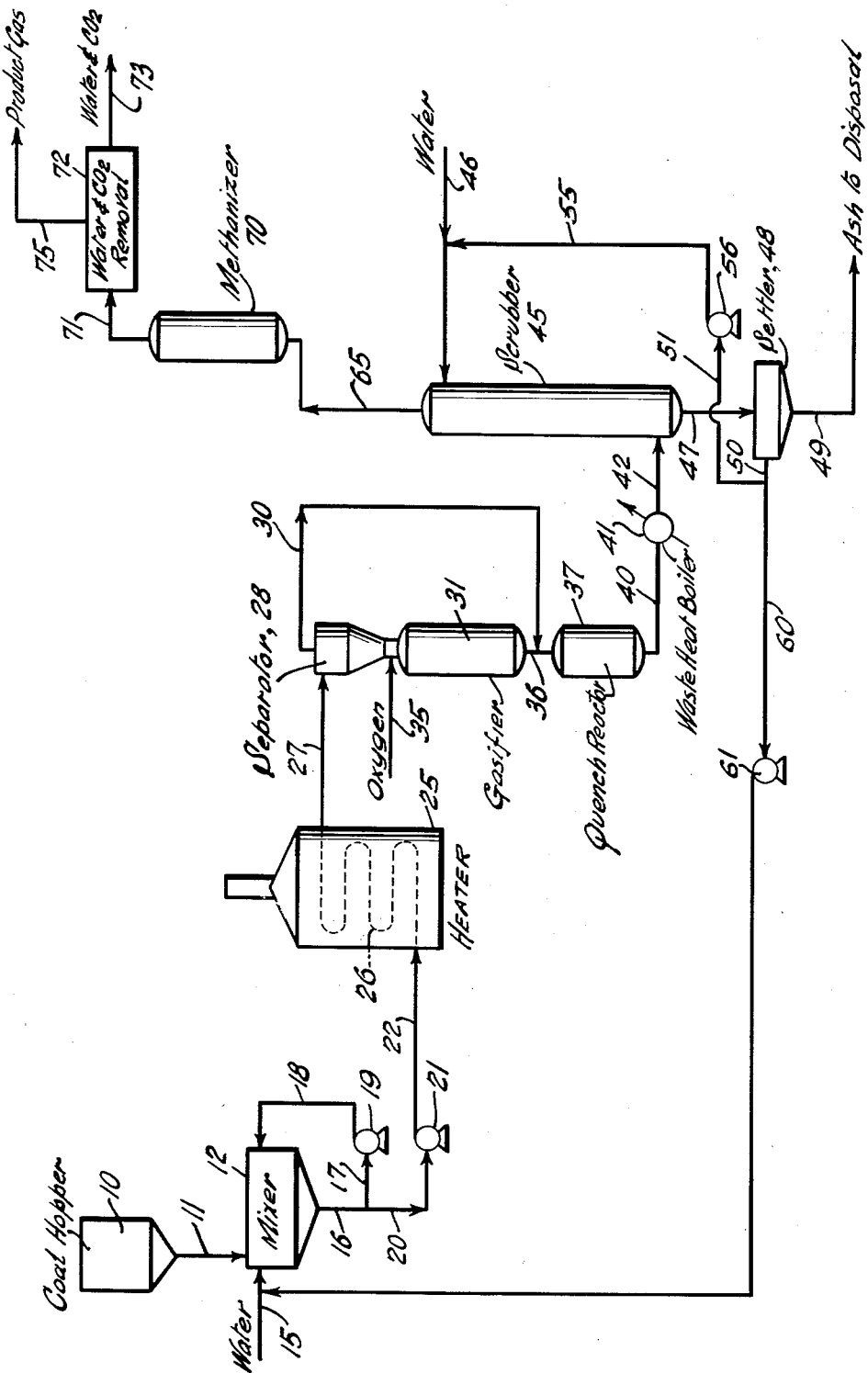

This invention relates to a process for the treatment of solid carbonaceous fuels. In one of its more specific aspects this invention relates to a method of forming a feed mixture of solid fuel in a gasiform carrier fluid, separating a portion of said carrier fluid, reacting said solid fuel and remaining carrier fluid with oxygen, and contacting the hot reactants with the separated carrier fluid effecting conversion of a portion of the carrier fluid to useful products.

Gas mixtures consisting essentially of carbon monoxide and hydrogen are commercially important as a source of hydrogen for various reactions and as a source of feed gas for the synthesis of hydrocarbons, oxygenated organic compounds, and ammonia. Solid carbonaceous fuels, for example, coal, lignite, oil shale, and wood may be reacted with oxygen and steam to produce gaseous mixtures of carbon monoxide and hydrogen. The solid particles are readily gasified while dispersed in the gaseous reactants and reaction products in a flow-type gasification reaction system. Gasification of a solid carbonaceous fuel with an oxygen-containing gas is usually effected at a temperature within the range of abuot 1800 to 3500° F. preferably about 2200 to 2800° F. A compact, unpacked reaction zone is preferred. The reaction may be carried out at atmospheric pressure or at an elevated pressure of the order of 100 to 500 pounds per square inch gauge or higher.

Air may be used as the source of free oxygen. Preferably the oxygen-containing gas contains in excess of 40 percent oxygen by volume, for example, oxygen enriched air. Oxygen of 95 percent purity is readily produced by the fractionation of air and is preferred particularly in those cases in which it is desired to produce a product gas stream substantially free of nitrogen, for example, in the production of hydrocarbon synthesis feed gas, fuel gas or hydrogen. The reaction of oxygen and carbonaceous fuel is exothermic. In addition to oxygen, steam, an endothermic reactant, is generally supplied to the reaction zone. The proportions of oxygen and steam are such as to maintain the desired reaction temperature autogenously. Instead of, or in addition to steam, other reducible oxygen-containing gases may be supplied to the reaction zone, for example, carbon dioxide. Reducible oxygen-containing solids may also be supplied to the reaction zone, for example, metal oxides, such as, the oxides of iron, copper and zinc. In general, if a nitrogen-free product is desired, it is advantageous to conduct the gasification reaction with a mixture of steam and pure oxygen as the gaseous reactants.

It is desirable to conduct the gasification reaction in a well-insulated reactor and to preheat the reactants. The reactants are preferably preheated to a temperature above about 600° F. Some reactants, e.g., steam and carbon dioxide, may be heated to a temperature on the order of 1200° F. or higher without difficulty. Others, for example, high purity oxygen, may not be highly heated without undue expense or hazard. It is desirable that the oxygen be heated to a temperature as high as practical. Generally, however, it is not feasible to preheat commercially pure oxygen to a temperature above about 600° F. to 800° F.

Advantageously, solid fuel is introduced into the gasification zone by a slurry feed method. In accordance with this method of feeding a solid fuel, the carbonaceous solid in granular or particle form is admixed with sufficient water to form a slurry. The slurry is passed through a tubular heating zone as a confined stream at relatively high velocity. The stream of slurry is heated to a temperature at least sufficient to effect vaporization of the water from the slurry within the heating zone. Vaporization of the water results in a great increase in volume which in turn greatly increases the velocity of flow of the stream through the heating zone. The solid particles are suspended in the steam resulting from vaporization. As this dispersion flows through the heating zone in highly turbulent flow, the solid particles are subjected to numerous collisions with one another and with the wall of the pipe resulting in pulverization of the solid. At the same time, heating the solid particles in the presence of steam results in volatilization of a part of the volatilizable constituents of the solid fuel.

In the method of forming a flowable slurry of solid fuel as disclosed herein, it has been found necessary to employ at least 45 weight percent water in a slurry of coal to form a pumpable mixture. The dispersion of coal in steam which is formed comprising 45 weight percent water vapor contains considerably more vapor than is necessary to transport the coal particles as a gaseous dispersion. Additionally this amount of steam is more than is desired as a reactant in the gas generation zone since only a part of the steam is reacted, the steam is an endothermic reactant, and excess steam increases the amount of oxygen required to maintain effective reaction temperatures. It is therefore desirable to separate a portion of the dispersion steam after formation of the dispersion and prior to introducing the remaining steam and dispersed solid fuel into the gasification zone. A portion of the steam may be readily separated from the remaining steam and dispersed solids without the loss of preheat and with little pressure drop by passing the dispersion through a centrifugal separator, for example, a cyclone separator. However, such means of separation are incomplete and the separated stream of steam contains a small amount of the finely pulverized solids and some volatilized constituents of the original solids. Although the volatilized and entrained material in the steam may be recovered by condensing and scrubbing the separated steam, such treatment results in a loss of the heat content of the steam which must be condensed to effect such a separation. In accordance with the process of this invention, the separated steam containing entrained fine solids and volatilized materials is efficiently utilized in the production of additional useful products by contacting with the effluent gases from the gas generation zone. The separated steam stream comprises quench medium as well as providing additional reactants for conversion to additional useful products.

The separated steam quench is advantageously contacted with the gas generator effluent in a zone of sufficient size to provide a contact time within the range of about 1 to 4 seconds. The temperature of the mixture in the quench zone is preferably maintained within the range of about 1200 to 2500° F. as determined by the gas generation temperature, by the relative amount of separated steam and by the optional use of an extraneous quenching medium, for example, water, steam or carbon dioxide. In the quench reaction zone, the hydrogen to carbon monoxide ratio of the synthesis gas product is shifted by virtue of the additional water vapor present. In addition, the volatilized components of the solid fuel which are present are converted at the high temperature to normally gaseous hydrocarbons. The quench step cools the synthesis gas product to a temperature below that at which the ash tends to adhere to the vessel walls and form sticky deposits. The temperature of the effluent gases from the quench zone is sufficiently low so that the gases may be passed directly to unlined steel processing equipment. Advantageously the quench zone effluent gases may be passed directly to a tubular heat exchanger, for example, a waste heat boiler, wherein steam is generated.

An advantage of the process of this invention is that solid carbonaceous fuels are efficiently converted to mixtures of carbon monoxide and hydrogen.

Another advantage of the process of this invention is that when employing a slurry feed technique in a gas generation process, steam containing volatilized components of the fuel and fine solids separated from the steam-fuel dispersion are efficiently converted to useful products.

The invention will be more readily understood from the accompanying drawing and the following detailed description of one embodiment of this invention. Although the drawing illustrates an apparatus in which the process of this invention may be practiced, it is not intended to limit the invention to the particular apparatus or materials described.

Coal crushed to a particle size less than 1/4 inch in average diameter and preferably less than about 1/8 inch in diameter is passed from hopper 10 through line 11 into mixer 12. Water in line 15 is introduced into mixer 12 and a stream of coal particles and water is rapidly circulated through lines 16, 17 and 18 by pump 19 and back to mixer 12 to form a slurry comprising a suspension of coal particles in water. A portion of the circulating slurry stream is withdrawn through line 20 by pump 21 and passed through line 22 to heater 25. The heating coil 26 in heater 25 is of relatively great length compared to its diameter.

Suitably the heating coil is arranged as a helix and may be constituted in sections disposed in a plurality of furnaces. The slurry is heated during passage through coil 26 to a temperature above the boiling point of water at the prevailing pressure effecting formation of a large volume of vapor and acceleration of the dispersion to a high velocity. The resulting stream of coal in steam is discharged from the heating coil through line 27 and is passed to separator 28. A portion of the steam and a small amount of entrained solids and volatilized components of the solid fuel is withdrawn through line 30.

Remaining steam and entrained solids in separator 28 pass through the bottom of the separator to gasifier 31. Oxygen which may be preheated is introduced through line 35 into admixture with the dispersion of coal and steam passed to gasifier 31. The coal, steam and oxygen react in gasifier 31 at an autogenous temperature within the range of about 1800 to 3500° F. to form products comprising hydrogen, carbon monoxide and entrained solids comprising ash constituents of the fuel. The reactants issuing from gasifier 31 in line 36 are quenched by contact with the separated stream in line 30 and the mixture passed into quench reactor 37 at a resulting temperature within the range of about 1200 to 2500° F. In quench reactor 37 the additional steam reacts with the hot gasifier effluent to generate additional hydrogen and volatilized components of the fuel contained in the separated stream are converted to normally gaseous hydrocarbon products. Quench reactor effluent in line 40 is passed through waste heat boiler 41 for the generation of useful steam.

Cool quench reactor effluent in line 42 is passed into scrubber 45 in countercurrent contact with water introduced through line 46 for the separation of entrained carbon and ash. Scrubbing water containing entrained solids is withdrawn from scrubber 45 through line 47 and discharged into settler 48. Ash separated in settler 48 is withdrawn through line 49 and discharged for disposal. Supernatant water from settler 48 is withdrawn through line 50 and a portion is recycled through lines 51 and 55 to scrubber 45 by pump 56. A portion of the supernatant water is withdrawn through line 60 by pump 61 and passed to line 15 to comprise at least a part of the water required in forming the coal slurry in mixer 12.

Scrubbed gases from scrubber 45 are withdrawn through line 65 and passed to methanizer 70 wherein a portion of hydrogen and carbon monoxide are reacted to form methane. Effluent gases from methanizer 70 in line 71 are passed to carbon dioxide and water removal facility 72. Water may be separated by conventional cooling and water separating devices. Carbon dioxide may be removed by conventional amine scrubbing methods. The separated water and carbon dioxide are discharged as indicated through line 73. Product gas of high heating value is discharged through line 75.

In an example of the process of this invention, a coal is gasified to form a hydrogen-carbon monoxide mixture. A bituminous coal having an ultimate analysis of 77.29 percent carbon, 4.93 percent hydrogen, 5.38 percent oxygen, 1.50 percent nitrogen, 2.59 percent sulfur and 8.31 percent ash is ground to an average size of 70 percent through a 200 mesh Tyler standard screen. The crushed coal, at a rate of 192,600 pounds per day, is slurried with 187,200 pounds per day of water. The slurry thus formed is pumped through a heating coil wherein it is heated to a temperature of 1000° F. In the heating coil the water is vaporized forming a dispersion of coal particles in steam. The dispersion is passed to a cyclone separator wherein 116,400 pounds per day of steam, volatilized components and fine coal particles are separated from the remaining steam-coal dispersion. This separated stream at 750° F. comprises 6820 pounds per day of volatilized components of the coal, 1560 pounds per day of fine coal particles and the balance steam.

The remaining dispersion comprising 184,200 pounds per day of coal and 79,200 pounds per day of steam is fed into a gas generator operated at 400 pounds per square inch gauge and an autogenous temperature of 2600° F. 79.3 tons per day of oxygen of 95 percent purity at a temperature of 300° F. are passed in admixture with the steam-coal dispersion to the gas generator. Gas generator effluent comprises 7,640,000 cubic feet per day of wet gas and has the analysis on a dry basis shown in column 1 of the table of gas analyses following. This gas stream at 2600° F. is contacted with the stream of separated steam, volatilized constituents and fine coal and the mixture comes to a temperature of 2200° F. This mixture is passed through a quench reactor providing a residence time of about 4 seconds. Effluent wet gas from the quench reactor comprises 10,050,000 standard cubic feet per day and has the composition on a dry basis shown in column 2 of the table of gas analyses, following. The quench reactor effluent is passed through a waste heat boiler wherein 173.5 tons per day of saturated steam are produced at 400 p.s.i.a. and the raw product gases are cooled to a temperature of 500° F. The raw product gases are passed in contact with a nickel catalyst effecting methanization of a part of the carbon monoxide and hydrogen. Effluent from the methanization zone comprises 6,760,000 standard cubic feet per day of wet gas. After cooling and scrubbing to remove water, $CO_2$ and sulfur compounds, the resulting gas totals 2,960,000 standard cubic feet per day. It has a heating value of 580 B.t.u.'s per cubic foot and the analysis shown in column 3 of the following table of gas analysis.

| Gas Analyses | Mol Percent Dry Basis | | |
|---|---|---|---|
| | 1 Gas Generator Effluent | 2 Quench Reactor Effluent | 3 Scrubbed Methanized Gas |
| Carbon Monoxide | 55.9 | 41.8 | 31.1 |
| Hydrogen | 33.3 | 39.4 | 24.6 |
| Carbon Dioxide | 7.1 | 15.1 | |
| Methane | 0.5 | 0.6 | 38.5 |
| Heavier Hydrocarbons | | 0.2 | 0.5 |
| Inerts | 2.4 | 2.1 | 5.3 |
| Sulfur compounds | 0.8 | 0.8 | |

The above table clearly shows a large increase in the hydrogen content and an even greater increase in the ratio of hydrogen to carbon monoxide achieved in quenching the gas generator effluent with the separated dispersion steam. The appearance of gaseous hydrocarbons produced at least in part by cracking of the volatilized and entrained constituents of the coal in the separated dispersion stream is also shown in comparison of the analysis of the gas generator effluent and the quench reactor effluent. The increased ratio of hydrogen to carbon monoxide of the quench reactor effluent makes possible the high methane production shown by the analysis of the scrubbed methanized gas.

Obviously many modifications and variations of the invention, as hereinbefore set forth, may be made without departing from the spirit and scope thereof and, therefore, only such limitations should be imposed as are indicated in the appended claims.

We claim:

1. In a process wherein a solid carbonaceous fuel is dispersed in a gasiform carrier fluid, said solid carbonaceous fuel and gasiform carrier fluid are heated to a temperature above about 700° F. effecting volatilization of a portion of said solid carbonaceous fuel, a portion of said carrier fluid and volatilized fuel is separated from a gas generator fuel feed stream comprising remaining carrier fluid and carbonaceous fuel residue, and said gas generator fuel feed stream is reacted with an oxygen-containing gas in a reaction zone at an autogenous temperature within the range of about 1800 to 3500° F. in relative proportions effecting conversion of said solid carbonaceous fuel mainly to carbon monoxide and hydrogen, the improvement which comprises admixing the effluent gases from said reaction zone with said separated carrier fluid and volatilized fuel at a combined temperature of at least 1200° F. effecting reaction therebetween, and thereafter cooling resulting products of reaction and contacting said products with water.

2. In a process for the gasification of a solid carbonaceous fuel, the combination which comprises forming a fluid mixture of said solid carbonaceous fuel with a vaporizable liquid, passing said fluid mixture through a heating zone, heating said mixture in said heating zone to a temperature above about 700° F. vaporizing substantially all of said liquid and volatilizing a portion of said solid fuel thereby forming a dispersion of solid fuel residue in resulting vapors, separating a stream comprising a portion of said resulting vapors from a gas generator fuel feed stream comprising remaining vapors and carbonaceous fuel residue, contacting said gas generator fuel feed stream with an oxygen containing gas in a reaction zone at an autogenous reaction temperature within the range of about 1800 to 3500° F. forming products comprising carbon monoxide and hydrogen, contacting effluent products from said reaction zone with said separated stream at a combined temperature of at least 1200° F. in a second reaction zone thereby forming additional hydrogen and normally gaseous hydrocarbons, passing said carbon monoxide, hydrogen and additionally formed hydrogen into contact with a methanization catalyst at methanizing conditions in a methanizing zone, and separating water and carbon dioxide from the product of said methanizing zone thereby forming a gas of high heating value.

3. The process of claim 2 wherein said vaporizable liquid is water.

4. The process of claim 2 wherein said solid carbonaceous fuel is selected from the group consisting of coal, lignite, oil shale and wood.

5. The process of claim 2 wherein said fluid mixture is heated in said heating zone to a temperature within the range of about 700 to 1200° F.

6. The process of claim 2 wherein said effluent products from said reaction zone and separated stream are contacted at a temperature within range of 1200 to 2500° F. in said quench zone.

References Cited in the file of this patent

UNITED STATES PATENTS

| | | |
|---|---|---|
| 2,621,117 | Garrison | Dec. 9, 1952 |
| 2,809,104 | Strausser | Oct. 8, 1957 |
| 2,829,957 | Carkeek | Apr. 8, 1958 |
| 2,838,388 | Carkeek | June 10, 1958 |
| 2,879,148 | Atwell | Mar. 24, 1959 |